(12) United States Patent
Kust

(10) Patent No.: US 8,114,924 B2
(45) Date of Patent: Feb. 14, 2012

(54) PEARLESCENT SLURRY CONCENTRATE FOR ACRYLIC SHEET

(75) Inventor: Paul Roger Kust, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 195 days.

(21) Appl. No.: 12/388,640

(22) Filed: Feb. 19, 2009

(65) Prior Publication Data

US 2009/0215951 A1  Aug. 27, 2009

Related U.S. Application Data

(60) Provisional application No. 61/030,258, filed on Feb. 21, 2008.

(51) Int. Cl.
*C09D 5/29* (2006.01)
(52) U.S. Cl. .......................... 523/171; 524/449
(58) Field of Classification Search .................. 523/171; 524/449
See application file for complete search history.

(56) References Cited

U.S. PATENT DOCUMENTS

| 6,040,045 | A | 3/2000 | Alfonso et al. |
| 6,156,325 | A | 12/2000 | Farer et al. |
| 6,515,060 | B2 | 2/2003 | Miller, III et al. |
| 6,613,444 | B1 | 9/2003 | Jaeckel et al. |

FOREIGN PATENT DOCUMENTS

WO  WO03/061937  7/2003

*Primary Examiner* — Edward Cain
(74) *Attorney, Agent, or Firm* — Dennis G. Morrell; John H. Lamming

(57) ABSTRACT

The disclosure provides a highly loaded pearlescent pigment acrylic polymer slurry concentrate for use as a pearlescent pigment additive for an acrylic polymer sheet, comprising: (a) about 35 to about 45 wt. % of a pearlescent pigment based on the weight of the slurry concentrate; (b) about 1.0 to about 5.0 wt. % of a copolymer dispersant comprising a pigment functional component derived from a monomer selected from the group consisting of urethane or urea, epoxy-containing methacrylate esterified with aromatic carboxylic acids, aliphatic carboxylic acids, ammonia and primary, secondary and tertiary aliphatic amines, primary aromatic amines, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6, hydroxyhexanoic acid, and 2-phenoxyethanol; (c) about 15 to about 45 wt. % of a ($C_1$-$C_{22}$) alkyl (($C_1$-$C_{10}$)alk) acrylate; and (d) about 0.1 to about 1.5 wt. % of a thixotropic agent.

22 Claims, No Drawings

PEARLESCENT SLURRY CONCENTRATE FOR ACRYLIC SHEET

BACKGROUND OF THE DISCLOSURE

1. Field of the Disclosure

The disclosure relates to a highly loaded pearlescent pigment acrylic polymer slurry concentrate for use as a pearlescent pigment additive for an acrylic polymer sheet, in particular the disclosure relates to an acrylic monomer pearlescent pigment slurry which comprises a copolymer dispersant.

2. Description of the Related Art

Acrylic sheets for making cast acrylic articles such as flooring, spas and ornamental products can be prepared from a curable acrylic solution comprising a monomer/copolymer mixture together with additives and pigments, including pearlescent pigments. A cast acrylic sheet which includes mica particulates is described in WO 03/061937. One particular mica pigment described therein is the Iriodin line of pigments which is included in the acrylic polymer in minor additive amounts with one example including a white pigment masterbatch dispersion together with the pearlescent mica pigment.

Typically, when making pearlescent acrylic sheets, it can be difficult to uniformly disperse the dry pearlescent pigment into the acrylic. While pigments can usually be incorporated by way of a masterbatch, masterbatch production of pearlescent pigments can pose challenges because the pigments tend to settle and form agglomerates which can pose filtration and viscosity problems. Energy intensive milling, which can be used to solve such problems with non-pearlescent pigment masterbatch compositions, can degrade the pearlescent appearance of pearlescent pigments. Consequently, pearlescent pigments are added in a dry powder form to the polymer, but dry addition can pose handling problems.

SUMMARY OF THE DISCLOSURE

In a first aspect, the disclosure provides a highly loaded pearlescent pigment acrylic polymer slurry concentrate for use as a pearlescent pigment additive for an acrylic polymer sheet, comprising:

(a) about 35 to about 45 wt. % of a pearlescent pigment based on the weight of the slurry concentrate;

(b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6-hydroxyhexanoic acid, and 2-phenoxyethanol;

(c) about 15 to about 45 wt. % of a ($C_1$-$C_{22}$) alkyl (($C_1$-$C_{10}$)alk) acrylate; and (d) about 0.1 to about 1.5 wt. % of a thixotropic agent.

In a second aspect, the disclosure provides a process for highly loading a pearlescent pigment acrylic polymer slurry concentrate for use as a pearlescent pigment additive for an acrylic polymer sheet, comprising: mixing a pearlescent pigment with an acrylic monomer to form a highly loaded pearlescent pigment acrylic polymer slurry comprising (a) about 35 to about 45 wt. % of a pearlescent pigment based on the weight of the slurry concentrate;

(b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6-hydroxyhexanoic acid, and 2-phenoxyethanol;

(c) about 15 to about 45 wt. % of a ($C_1$-$C_{22}$) alkyl (($C_1$-$C_{10}$)alk) acrylate; and (d) about 0.1 to about 1.5 wt. % of a thixotropic agent.

In a third aspect, the disclosure provides an acrylic polymer composition for making an acrylic polymer sheet having a pearlescent effect comprising a major amount of an acrylic polymer and a minor amount of a highly loaded pearlescent pigment acrylic polymer slurry concentrate, comprising:

(a) about 35 to about 45 wt. % of a pearlescent pigment based on the weight of the slurry concentrate;

(b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6-hydroxyhexanoic acid, and 2-phenoxyethanol;

(c) about 15 to about 45 wt. % of a ($C_1$-$C_{22}$) alkyl (($C_1$-$C_{10}$)alk) acrylate; and (d) about 0.1 to about 1.5 wt. % of a thixotropic agent.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range. It is to be appreciated that certain features of the disclosure which are, for clarity, described above and below in the context of separate embodiments, may also be provided separately or in any subcombination. In addition, references in the singular may also include the plural (for example, "a" and "an" may refer to one, or more) unless the context specifically states otherwise.

In one embodiment, the disclosure herein can be construed as excluding any element or process step that does not materially affect the basic and novel characteristics of the composition or process. Additionally, the disclosure can be construed as excluding any element or process step not specified herein.

DETAILED DESCRIPTION OF THE DISCLOSURE

The highly loaded pearlescent pigment acrylic polymer slurry concentrate comprises a pearlescent pigment additive, a copolymer dispersant, an alkyl (alk)acrylate, a thixotropic agent. Optionally, the slurry can include a polymerization inhibitor, a thickener, and a thixotropic agent.

The pearlescent pigment suitable for use in the slurry of the disclosure can comprise at least one of inorganic metallic materials comprising copper, bronze, gold; inorganic metal oxide such as oxide or hydroxide of cobalt, chromium, tin, iron, aluminum, zinc, titanium, nickel, manganese and antimony; and mica particulates such as, muscovite, paragonite, margarite, and celadonite. In one particular embodiment the mica particulates include a coating or treatment of at least one inorganic pigment such as titanium dioxide, iron oxide, chromium hydroxide, silicon oxide, antimony oxide, borosilicate, or tin oxide or combinations thereof. The mica can be synthetic mica coated or treated with one or more of the foregoing inorganic pigments. A titanium dioxide-coated mica pigment can be especially useful. Suitable examples of pigments are sold under the Trademark Iriodin® by Merck and Co. such as Iriodin® 110, or Engelhard-BASF Mearlin® pearlescent pigments such as Super Copper 9350Z, Super Bronze 9250, Super Sparkle 9110S, Sparkle Gold 9212P, Nu Antique Bronze 9240AB or Hi Lite Super Green 9830Z.

The particle size diameter of a major amount of the pigment particles can have a maximum size diameter of about 500 µm to a minimum size diameter of about 5 µm, typically from about 300 µm to about 10 µm.

The slurry concentrate can have a high loading of the pigment. Typically the amount of the pigment ranges from about 35 wt. % to about 45 wt %, more typically from about 37 wt. % to about 45 wt. %, even more typically from about 40 wt. % to about 45 wt. % based on the weight of the slurry concentrate.

The copolymer dispersant comprises a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6-hydroxyhexanoic acid, and 2-phenoxyethanol. Typically the copolymer is a block copolymer but a random copolymer can also be suitable. The copolymer dispersant can be a polyester urethane/urea block copolymer with an average molecular weight of about 16,000 and polydispersity of about 3.5. A suitable example of a commercially available polyester block copolymer is BYK 9077 commercially available from Byk-Chemie.

The alkyl (alk)acrylate can be a ($C_1$-$C_{22}$) alkyl (($C_1$-$C_{10}$) alk) acrylate. The $C_1$-$C_{22}$ alkyl group of the alkyl (alk) acrylate is selected from the group consisting of methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, petnadecyl, hexadecyl, heptadecyl, octadecyl, nonadecyl, eicosyl, behenyl, and isomers thereof and the $C_1$-$C_{10}$ alk group of the alkyl (alk) acrylate is selected from the group consisting of methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof.

The thixotropic agent can be a modified urea, silica, talc, or organically modified clay. A commercially available modified urea thixotropic agent dissolved in an n-alkyl pyrrolidone such as n-methyl or n-ethyl pyrrolidone is sold under the product designation BYK-410 or BYK-410E by BYK Chemie.

The slurry can contain a monomer for solubilizing the thixotropic agent, which can be an acrylic monomer comprising a functional group selected from the group consisting of hydroxyl, thiol and amine or combination thereof; an example, without limit, of such a solubilizing monomer is 2-hydroxyethyl methacrylate.

The optional polymerization inhibitor can be selected from the group consisting of hydroquinone monomethyl ether, parabenzoquinone, and phenothiazine.

The optional thickener can be selected from the group consisting of polymethyl (meth) acrylate, polyethyl (meth) acrylate, polybutyl (meth) acrylate, and polyisobutyl (meth) acrylate.

Other optional additives for the pearlescent pigment slurry can be light stabilizer, optical brightener, a dye, or another pigment.

The slurry concentrate is mixed in a minor concentrate amount into a major amount of an acrylic polymer to form a pearlescent acrylic polymer composition. The amount of the slurry concentrate can range from about 1.0 wt. % to about 10.0 wt. %, typically from about 2.0 wt. % to about 7.0 wt. % and the amount of the acrylic polymer can range from about 30 wt. % to about 99 wt %, typically from about 35 wt. % to about 95 wt. %, based on the total weight of the pearlescent acrylic polymer composition.

The acrylic polymer can be a polymerizable matrix derived from about 60 to about 100 wt. % methyl methacrylate monomer, about 0 to about 40 wt. % of at least one other copolymerizable alkyl (alk)acrylate comonomer, and about 0 to about 10 wt. % of a copolymerizable cross-linking monomer.

The alkyl (alk) acrylate polymer can be a polymer or copolymer of a ($C_1$-$C_{22}$) alkyl (($C_1$-$C_{10}$)alk) acrylate and the copolymerizable cross-linking monomer can be a difunctional (alk)acrylate.

The $C_1$-$C_{22}$ alkyl group of the alkyl (alk) acrylate polymer or copolymer can be selected from the group consisting of methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, petnadecyl, hexadecyl, heptadecyl, octadecyl, nonadecyl, eicosyl, behenyl, and isomers thereof and the $C_1$-$C_{10}$ alk group of the alkyl (alk) acrylate can be selected from the group consisting of methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof and the difunctional (alk)acrylate can be selected from the group consisting of ethylene glycol dimethacrylate, polyethylene glycol diacrylate and dimethacrylate, propylene glycol dimethacrylate and diacrylate, glycidyl methacrylate and divinyl benzene.

The acrylic polymer can be a high molecular weight acrylic polymer. The molecular weight average weight can range from about 100,000 to about 300,000. Suitable examples of acrylic polymers include, without limit, poly (methyl methacrylate) having a molecular weight of about 120,000 which is commercially available from Lucite International sold under the product name Elvacite® 2009 and poly (iso-butyl methacrylate) having a molecular weight of about 193,000 which is commercially available from Lucite International sold under the product designation Elvacite® 2045.

Some optional additives for the pearlescent acrylic composition can be one or more of gloss agents, matting agents, light stabilizers, flame retardants, dyes, pigments, viscosity control agents, curing agents (chemical and thermal), antioxidants, optical brighteners, and the like.

The process for making the slurry can comprise a plurality of steps. As an example, without limit, a first mixture can be made by mixing a first portion of the monomer for solubilizing the thixotropic agent, the optional polymerization inhibitor, and a first portion of the alkyl(alk)acrylate copolymer and heating the first mixture to about 40° C. in a suitable vessel. A second mixture can be obtained by adding to the first mixture the acrylic polymer, copolymer dispersant and mixing the second mixture until the acrylic polymer and copolymer dispersant dissolve. The pigment can be added to the second mixture, preferably once the second mixture is cooled, and mixed until the pigment is dispersed to form a pigment dispersion. The pigment dispersion can be mixed with a second portion of the monomer for solubilizing the thixotropic agent, a second portion of the alkyl(alk)acrylate copolymer and the thixotropic agent which can be stirred in until dissolved.

In another process for making the slurry, the alkyl (alk) acrylate, the optional polymerization inhibitor and pigment are mixed and then the copolymer dispersant is added to obtain a pigment dispersion of suitable viscosity.

In another process for making the slurry a first portion of the monomer for solubilizing the thixotropic agent, the optional polymerization inhibitor and a first portion of the alkyl (alk) acrylate are added to a mixing vessel, the thixotropic agent is added and the ingredients mixed together until the thixotropic agent is dissolved to form a second mixture. The pigment is added to form a third mixture which is stirred for a time and stirring intensity sufficient to form a dispersion. A second portion of the monomer for solubilizing the thixotropic agent, and a second portion of the alkyl (alk) acrylate are added to the third mixture to form a fourth mixture which is stirred until the monomer for solubilizing the thixotropic agent, and the alkyl (alk) acrylate are dissolved to form a slurry having a suitable viscosity.

The description of illustrative and preferred embodiments of the present disclosure is not intended to limit the scope of the disclosure. Various modifications, alternative constructions and equivalents may be employed without departing from the true spirit and scope of the appended claims.

EXAMPLES

The following Examples illustrate certain embodiments of the disclosure. All parts, percentages and proportions are by weight unless otherwise indicated.

Example A 108 g hydroxyethyl methacrylate, 0.03 g hydroquinone monomethyl ether, and 72 g 2-ethylhexyl methacrylate were added to a jacketed stainless-steel mixing vessel and heated to 40° C. 27 g Elvacite® 2009 poly(methylmethacrylate) and 7.2 g of polyester block copolymer Byk-9077 were added and mixed for 90 minutes until dissolved. The solution was allowed to cool to 30° C., and 180 g Iriodin® 110 pigment were added; the mixture was then mixed at 1600 RPM for 60 minutes. 7.45 g hydroxyethyl methacrylate, 7.45 g 2-ethylhexyl methacrylate, and 0.9 g modified urea Byk-410 were then stirred in until dissolved. The final slurry had a viscosity of 820 cp measured on a Brookfield LV viscometer using a #34 spindle at 12 RPM.

Example B 140 g hydroxyethyl methacrylate, 0.03 g hydroquinone monomethyl ether, and 140 g 2-ethylhexyl methacrylate were added to a jacketed stainless-steel mixing vessel and heated to 40° C. 27 g Elvacite® 2045 poly(isobutylmethacrylate) and 11.2 g polyester block copolymer Byk-9077 were added and mixed for 40 minutes until dissolved. The solution was allowed to cool to 30° C., and 280 g Mearlin Sunset Gold pigment were added; the mixture was then mixed at 1600 RPM for 60 minutes. 92.75 g hydroxyethyl methacrylate and 1.05 g modified urea Byk-410 were then stirred in until dissolved. The final slurry had a viscosity of 186 cp measured on a Brookfield LV viscometer using a #34 spindle at 30 RPM.

Example C 160 g hydroxyethyl methacrylate, 0.03 g hydroquinone monomethyl ether, and 90 g 2-ethylhexyl methacrylate were added to a jacketed stainless-steel mixing vessel and heated to 40° C. 40 g Elvacite® 2045 poly(isobutylmethacrylate) and 12.8 g polyester block copolymer Byk-9077 were added and mixed for 40 minutes until dissolved. The solution was allowed to cool to 30° C., and 320 g Iriodin® 103 pigment were added; the mixture was then mixed at 1600 RPM for 60 minutes. 176 g hydroxyethyl methacrylate and 1.2 g modified urea Byk-410 were then stirred in until dissolved. The final slurry had a viscosity of 4484 cp measured on a Brookfield LV viscometer using a #34 spindle at 12 RPM.

Example D 64.97 g 2-ethylhexyl methacrylate and 0.03 g hydroquinone monomethyl ether were added to a mixing vessel. 35 g Iriodin® 110 pigment were added to the mixture. The mixture was too viscous to be mixed, and only yielded when 2 g polyester block copolymer Byk-9077 was added.

Example E 46 g hydroxyethyl methacrylate, 0.05 g hydroquinone monomethyl ether, and 46 g 2-ethylhexyl methacrylate were added to a jacketed stainless-steel mixing vessel. 0.95 g modified urea Byk-410 was added and mixed for 40 minutes until dissolved. 52.5 g Iriodin® 110 pigment were added; the mixture was then mixed at 1600 RPM for 30 minutes. 2.25 g hydroxyethyl methacrylate and 2.25 g 2-ethylhexyl methacrylate were then stirred in until dissolved. The final slurry had a viscosity of 243.4 cp measured on a Brookfield LV viscometer using a #18 spindle at 12 RPM.

What is claimed is:
1. A highly loaded pearlescent pigment acrylic polymer slurry concentrate for use as a pearlescent pigment additive for an acrylic polymer sheet, comprising:
  (a) about 35 to about 45 wt. % of a pearlescent pigment based on the weight of the slurry concentrate;
  (b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6, hydroxyhexanoic acid, and 2-phenoxyethanol;
  (c) about 15 to about 45 wt. % of a ($C_1$-$C_{22}$) alkyl (($C_1$-$C_{10}$)alk) acrylate; and
  (d) about 0.1 to about 1.5 wt. % of a thixotropic agent.
2. The highly loaded pearlescent pigment acrylic polymer slurry concentrate of claim 1 further comprising a polymer- ization inhibitor selected from the group consisting of hydroquinone monomethyl ether, parabenzoquinone, and phenothiazine.

3. The highly loaded pearlescent pigment acrylic polymer slurry concentrate of claim 1 further comprising a thickener selected from the group consisting of polymethyl (meth) acrylate, polyethyl (meth) acrylate, polybutyl (meth) acrylate, and polyisobutyl (meth) acrylate.

4. The highly loaded pearlescent pigment acrylic polymer slurry concentrate of claim 1 further comprising a monomer for solubilizing the thixotropic agent.

5. The highly loaded pearlescent pigment acrylic polymer slurry concentrate of claim 4 in which the thixotropic agent is a modified urea and the monomer for solubilizing the thixotropic agent is an acrylic monomer comprising a functional group selected from the group consisting of hydroxyl, thiol and amine or combination thereof.

6. The highly loaded pearlescent pigment acrylic polymer slurry concentrate of claim 5 in which the monomer for solubilizing the thixotropic agent is 2-hydroxyethyl methacrylate.

7. The highly loaded pearlescent pigment acrylic polymer slurry concentrate of claim 1 in which the pearlescent pigment is mica selected from the group consisting of muscovite, paragonite, margarite, and celadonite, and synthetic mica coated with titanium dioxide, iron oxide, silicon oxide, antimony oxide, tin oxide, borosilicate, and combinations thereof.

8. The highly loaded pearlescent pigment acrylic polymer slurry concentrate of claim 1 in which the $C_1$-$C_{22}$ alkyl group of the alkyl (alk) acrylate is selected from the group consisting of methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof and the $C_1$-$C_{10}$ alk group of the alkyl (alk) acrylate is selected from the group consisting of methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof.

9. The highly loaded pearlescent pigment acrylic polymer slurry concentrate of claim 1 in which the copolymer dispersant is a polyester urethane/urea block copolymer with an average molecular weight of about 16,000 and polydispersity of ~3.5.

10. A process for highly loading a pearlescent pigment acrylic polymer slurry concentrate for use as a pearlescent pigment additive for an acrylic polymer sheet, comprising: mixing a pearlescent pigment with an acrylic monomer to form a highly loaded pearlescent pigment acrylic polymer slurry comprising
    (a) about 35 to about 45 wt. % of a pearlescent pigment based on the weight of the slurry concentrate;
    (b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6, hydroxyhexanoic acid, and 2-phenoxyethanol;
    (c) about 15 to about 45 wt. % of a ($C_1$-$C_{22}$) alkyl (($C_1$-$C_{10}$)alk) acrylate; and
    (d) about 0.1 to about 1.5 wt. % of a thixotropic agent.

11. The process of claim 10 in which the slurry further comprises a polymerization inhibitor selected from the group consisting of hydroquinone monomethyl ether, parabenzoquinone, and phenothiazine.

12. The process of claim 10 in which the slurry further comprises a thickener selected from the group consisting of polymethyl (meth) acrylate, polyethyl (meth) acrylate, polybutyl (meth) acrylate, and polyisobutyl (meth) acrylate.

13. The process of claim 10 in which the slurry further comprises a monomer for solubilizing the thixotropic agent.

14. The process of claim 13 in which the thixotropic agent of the slurry is a modified urea and the monomer for solubilizing the modified urea is an acrylic monomer comprising a functional group selected from the group consisting of hydroxyl, thiol and amine or combination thereof.

15. The process of claim 14 in which the monomer for solubilizing the thixotropic agent is 2-hydroxyethyl methacrylate.

16. The process of claim 10 in which the pearlescent pigment is mica selected from the group consisting of muscovite, paragonite, margarite, and celadonite, and synthetic mica coated with titanium dioxide, iron oxide, silicon oxide, antimony oxide, tin oxide, borosilicate, and combinations thereof.

17. The process of claim 10 in which the $C_1$-$C_{22}$ alkyl group of the alkyl (alk) acrylate is selected from the group consisting of methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof and the $C_1$-$C_{10}$ alkyl group of the alkyl (alk) acrylate is selected from the group consisting of methyl, ethyl, n-propyl, iso-propyl, n-butyl, iso-butyl, tert-butyl, pentyl, hexyl, cyclohexyl, 2-ethylhexyl, heptyl, octyl, nonyl, decyl and isomers thereof.

18. The process of claim 10 in which the copolymer dispersant is a polyester urethane/urea block copolymer with an average molecular weight of about 16,000 and polydispersity of about 3.5.

19. An acrylic polymer composition for making an acrylic polymer sheet having a pearlescent effect comprising a major amount of an acrylic polymer and a minor amount of a highly loaded pearlescent pigment acrylic polymer slurry concentrate, comprising:
    (a) about 35 to about 45 wt. % of a pearlescent pigment based on the weight of the slurry concentrate;
    (b) about 1.0 to about 5.0 wt. % of a copolymer dispersant comprising a pigment functional component derived from a monomer selected from the group consisting of urethane or urea, epoxy-containing methacrylate esterified with aromatic carboxylic acid, aliphatic carboxylic acid, ammonia and primary, secondary and tertiary aliphatic amine, primary aromatic amine, and alkyl methacrylate; and a solvent functional component derived from a monomer selected from the group consisting of methyl methacrylate, butyl methacrylate, ethyl hexyl methacrylate, lauryl methacrylate, 1,2-propane diol, 6, hydroxyhexanoic acid, and 2-phenoxyethanol;
    (c) about 15 to about 45 wt. % of a ($C_1$-$C_{22}$) alkyl (($C_1$-$C_{10}$)alk) acrylate; and
    (d) about 0.1 to about 1.5 wt. % of a thixotropic agent.

20. The acrylic polymer composition of claim 19 in which the acrylic polymer is a polymerizable matrix derived from about 60 to about 100 wt. % methyl methacrylate monomer, about 0 to about 40 wt. % of at least one other copolymerizable alkyl (alk)acrylate comonomer, and about 0 to about 10 wt. % of a copolymerizable cross-linking monomer.

21. The acrylic polymer composition of claim 20 in which the alkyl (alk) acrylate comonomer is a ($C_1$-$C_{22}$) alkyl (($C_1$-$C_{10}$)alk) acrylate and the copolymerizable cross-linking monomer is a difunctional (alk)acrylate.

22. The acrylic polymer composition of claim 21 in which the $C_1$-$C_{22}$ alkyl group of the alkyl (alk) acrylate is selected from the group consisting of methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof and the $C_1$-$C_{10}$ alk group of the alkyl (alk) acrylate is selected from the group consisting of methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof and the difunctional (alk)acrylate is selected from the group consisting of ethylene glycol dimethacrylate, polyethylene glycol diacrylate and dimethacrylate, propylene glycol dimethacrylate and diacrylate, glycidyl methacrylate and divinyl benzene.

* * * * *